United States Patent [19]
Waddill

[11] 4,187,367
[45] Feb. 5, 1980

[54] EPOXY RESINS WITH IMPROVED ADHESION AND PEEL STRENGTH

[75] Inventor: Harold G. Waddill, Austin, Tex.

[73] Assignee: Texaco Development Corporation, White Plains, N.Y.

[21] Appl. No.: 890,749

[22] Filed: Mar. 27, 1978

[51] Int. Cl.$^2$ .................... C08G 59/56; C08G 59/60
[52] U.S. Cl. ........................................ 528/94; 528/93; 528/111; 528/367; 528/407; 525/113; 525/507
[58] Field of Search .................... 260/830 R; 528/111, 528/135, 407, 93, 367, 88, 94

[56] References Cited

U.S. PATENT DOCUMENTS

| | | | |
|---|---|---|---|
| 3,380,881 | 4/1968 | Williamson et al. | 161/185 |
| 3,462,393 | 8/1969 | Legler | 260/47 |
| 3,496,138 | 2/1970 | Sellers et al. | 260/47 |
| 3,645,969 | 2/1972 | Harvey | 260/47 EN |
| 4,002,598 | 1/1977 | Waddill et al. | 260/47 EN |

OTHER PUBLICATIONS

Kirk-Othmer, "Encyclopedia of Chemical Technology", 2nd Ed., 1965, Wiley & Sons.

*Primary Examiner*—Earl A. Nielsen
*Attorney, Agent, or Firm*—Carl G. Ries; Thomas H. Whaley; Kenneth R. Priem

[57] ABSTRACT

A process is disclosed for making a cured epoxy resin which has improved adhesion and peel strength. The cured resin is made by combining an epoxy resin with a polyether diureide having terminal ureido or monosubstituted ureido groups and having a molecular weight of from about 2000 to 3000 and an aminoalkylene derivative of a polyoxyalkylenepolyamine. The cured resin is useful, for example, for bonding metals.

24 Claims, No Drawings

EPOXY RESINS WITH IMPROVED ADHESION AND PEEL STRENGTH

BACKGROUND OF THE INVENTION

The invention pertains to the field of epoxy resins.

Curing epoxy resins with amino containing compounds is known in the art. It has been found that a cured epoxy resin with a surprisingly high peel strength and adhesion may be made using a combination of amino containing compounds.

SUMMARY OF THE INVENTION

The invention is a process for making a cured epoxy resin having improved adhesion and peel strength. The process involves mixing an epoxy resin with a polyether diureide having terminal ureido or monosubstituted ureido groups and having a molecular weight of from about 2000 to 3000 and an aminoalkylene derivative of a polyoxyalkylenepolyamine.

The invention is also the cured epoxy resin and the combination of the polyether diureide and the aminoalkylene derivative of a polyoxyalkylene polyamine.

DESCRIPTION OF THE PREFERRED EMBODIMENTS

Generally the vicinal polyepoxide containing compositions which are amine cured are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolak, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyl-diethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis (4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be amine cured and are in accordance with the instant invention includes the epoxy novolak resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolak resins can be obtained in Lee, H. and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The aminoalkylene derivative of polyoxyalkylenepolyamine can be made by reacting a polyoxyalkylenepolyamine with acrylonitrile followed by hydrogenation of the product.

In a preferred embodiment a polyoxyalkylene polyamine has an average molecular weight of about 400. For example, polyoxypropylenepolyamine used as a starting material has the following formula:

where $x \simeq 5.6$

After reaction with acrylonitrile and subsequent hydrogenation the resulting aminoalkylene derivative of polyoxyalkylenepolyamine has the following formula:

where $x \simeq 5.6$

The polyether diureide additive can generally be described as polyoxyalkylene containing materials having terminal ureido or mono-substituted ureido groups and a molecular weight of from about 2000 to about 3000. More specifically, these compounds are polyoxyalkylene compounds having terminal ureido groups, of the formula:

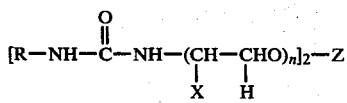

wherein R is hydrogen; or, a branched or straight chain alkyl radicals of from 1 to about 10 carbon atoms, and more preferably from 1 to about 6; or a monocyclic aryl, alkaryl or aralkyl having from 6 to about 12 carbon atoms; and more preferably 6 to about 8; or, are branched or straight chain alkenyl or alkadienyl radical of from 2 to about 10 carbon atoms and more preferably 3 to about 8; X is hydrogen, a methyl radical or an ethyl radical; Z is a hydrocarbon alkylene radical having 2 to 5 carbon atoms and n is a number selected such that the molecule of the above formula has a molecular weight of from about 2000 to about 3000. The preferred diureides are of the above formula wherein R is hydrogen or a lower alkyl, and more preferably a lower alkyl of from 1 to 4 carbon atoms; X is a methyl radical; Z is a 1,2-propylene radical; and n is a number from 16 to 19. Preferred lower alkyl groups include methyl, ethyl, n-propyl and n-butyl.

The polyether diureide compounds are formed by the reaction of a ureido or mono-substituted ureido forming compound with a polyoxyalkylene diamine having a molecular weight value such that the ureido containing product has a molecular weight of from about 2000 to about 3000 at temperatures in the range from about 25° C. to about 150° C. in a molar ratio of about 2 moles of ureido or mono-substituted ureido forming compound for each mole of diamine.

The diamines that are useful in forming the additives are polyoxyalkylenediamines of the formula:

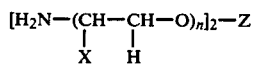

wherein X is a hydrogen, a methyl radical or an ethyl radical; Z is a hydrocarbon alkylene radical having from 2 to 5 carbon atoms; and, n is an average number of from about 15 to about 25. Preferred polyoxypropylene diamines wherein X is a methyl radical, n is an average number from 16 to 19, Z is a 1,2-propylene radical. These polyoxyalkylene polyamines can be prepared by known methods as disclosed in U.S. Pat. Nos. 3,236,895 and 3,654,370.

The ureido forming compounds are generally those which supply the O=C—$NH_2$ radical. Urea is preferred. When urea is employed as a reactant, the reaction proceeds with the evolution of ammonia and the terminal primary amino groups of the polyoxyalkylenepolyamine are converted directly to ureido groups.

While urea is the preferred ureido forming compound, other ureido forming compounds can be utilized. Since the polyoxyalkylenepolyamine reactant already contains terminal primary amino groups, isocyanates of the general formula $M^+$ $NCO^-$, wherein $M^+$ is generally an alkali metal such as potassium, sodium and the like can be used. The preferred isocyanates that can be used in accordance with the instant invention are sodium and potassium isocyanate primarily because of availability.

The mono-substituted ureido forming compounds are generally isocyanates of the formula R—N=C=O wherein R has the character of either an aliphatic or aromatic monovalent hydrocarbon radical as defined herein above.

In accordance with this method, the reactants are simply admixed in correct molar ratios in a suitable reaction vessel and heated, if necessary, until the reaction occurs.

The functionality of the polyoxyalkylenepolyamine is dependent upon the number of terminal primary amino groups which in the instant case is 2. It will be realized that each mole of ureido forming compound or substituted ureido forming compound will react with a single terminal primary amino group of the polyoxyalkylenepolyamine. It is particularly important that, in forming the additive compounds of the instant invention, a specific molar ratio of reactants be maintained. Specifically, about 1 mole of ureido forming compound for each amino group of the polyoxyalkylenepolyamine is required. Thus, with the diamine, about 2 moles of ureido forming compound is utilized. Preferably the instant reaction is carried out in the presence of a slight excess of ureido forming compound to assure complete conversion of the amino groups.

Optionally, the epoxy resin formulations of the instant invention can include an "accelerator" to speed the amine cure of the epoxy resin, especially at ambient temperatures. In several applications, such acceleration is beneficial, especially when an epoxy resin is used as an adhesive in flammable environment, thus making elevated temperature cure inconvenient or even hazardous. Lee, H. and Neville, K., *Handbook of Epoxy Resins,* pp. 7-14 describes the use of certain amine-containing compounds as epoxy curing agent-accelerators.

Many accelerators are known in the art which can be utilized in accordance with the instant invention. Examples include salts of phenols; salicyclic acids; amine salts of fatty acids such as those disclosed in U.S. Pat. No. 2,681,901; and, tertiary amines such as those disclosed in U.S. Pat. No. 2,839,480. A preferred accelerator in accordance with the instant invention is disclosed in U.S. Pat. No. 3,875,072 issued to G. Waddill, Apr. 1, 1975. The accelerator comprises a combination of piperazine and an alkanol amine in a weight ratio of about 1:8 to 1:1.

According to the method of the instant invention, the adhesion properties of prior art amine-cured epoxy resins are enhanced by the addition of an effective amount of a polyether diureide having terminal ureido or mono-substituted ureido groups and a molecular weight of from about 2000 to about 3000 and an aminoalkylene derivative of a polyoxyalkylene polyamine wherein the polyoxyalkylene polyamine has an average molecular weight of about 400; as hereinbefore described. The amount of this combination effective in bringing about the increased adhesive and peel strength properties is somewhat empirical and will depend upon many factors. Generally, the diureido additive can be utilized in amounts from about 5 to about 50 parts by weight based on one hundred parts by weight of the resin constituent and the aminoalkylene derivative of the polyoxyalkylene polyamine can be utilized in amounts ranging from about 40 to 60 parts per 100 parts of the epoxy resin constituent.

The amine cured resins having superior adhesion in accordance with the instant invention are prepared in a conventional manner. The amine curing agent combination is admixed with the polyepoxide composition in amounts according to the amine equivalent weight of the curing agent combination employed. Generally the number of equivalents of amine groups is from about 0.8 to about 1.2 times the number of epoxide equivalents present in the curable epoxy resin composition, with a stoichiometric amount being preferred. When using an accelerator, amounts from 1 to about 10 parts by weight based on 100 parts by weight of the resin are generally satisfactory. The exact amount of constituents in accordance with the above general requirements will depend primarily on the application for which the cured resin is intended.

The diureido and aminoalkylene derivative of polyoxyalkylene polyamine are incorporated into the uncured resin by admixing. Preferably, the combination is first admixed with other curing agents and/or the accelerator prior to addition to the resin. The constituents forming the curable material are then intimately admixed by standard methods and degassed in the presence of a commercial defoamer and minute amounts of silicone oils to prevent voids and bubbles.

Although all of the epoxy resins disclosed herein are generally useful in accordance with the instant inventive concept, those based on aliphatic compounds are preferably not used exclusively. The presence of resins containing polyglycidyl ethers of polyhydric phenols in amounts greater than 50% by weight of the resin constituent, and more preferably 80% by weight and more preferably 100% by weight has been shown to greatly enhance the desirable properties of the cured material, especially the adhesive strength.

Generally, the mixture of epoxy resin, the polyether diureide, the aminoalkylene derivative of polyoxyalkylenepropylene polyamine, and the accelerator combination of piperazine and alkanolamine is allowed to self-cure at ambient temperatures of between 0° C. to about 45° C. However, it has been found expeditious that the mixture be cured or post-cured at elevated temperatures of up to about 135° C.

According to a greatly preferred embodiment, resins of the polyglycidyl ether of polyhydric phenol type are cured by incorporating therein about a stoichiometric amount of an aminoalkylene derivative of a polyoxyalkylenepolyamine having a molecular weight of about 400; from about 5 to 40 parts by weight of the polyether diureido terminated polyoxyalkylenepolyamine having a molecular weight of about 2000; and from 1 to 5 weight percent based on 100 parts by weight of the resin of an accelerator comprising a 30:70 weight percent admixture of piperazine:triethanolamine. The composition is cured at room temperature (about 25° C.) to produce products having superior adhesive strength in accordance with the instant invention.

It will further be realized that various conveniently employed additives can be admixed with the polyepoxide containing composition of the instant invention prior to final cure. For example, in certain instances it may be desired to add minor amounts of other polyalkyleneamine co-catalysts as herein described, or hardeners along with various other accelerators and curing agent systems well known in the art.

Additionally, conventional pigments, dyes, fillers, flame retarding agents and the like which are compatible, natural or synthetic resins can be added.

Furthermore, although not preferred, known solvents for polyepoxide materials such as toluene, benzene, xylene, dioxane, ethylene glycol monomethyl ether and the like can be used. The polyepoxide resins containing the additives of the instant invention can be used in any of the above applications for which polyepoxides are customarily used. The compositions of the instant invention can be used as impregnants, surface coatings, pottings, capsulating compositions, laminants, and, particularly and most importantly, as adhesives for bonding metallic elements or structures permanently together.

The following examples illustrate the nature of the instant invention but are not intended to be limitative thereof.

EXAMPLE 1

This example demonstrates that cured epoxy resins containing the combination of a polyetherdiureide of about 2000 molecular weight and an aminoalkylene derivative of a polyoxyalkylenepolyamine wherein the polyoxyalkylenepolyamine is of about 400 molecular weight have improved properties over formulations not containing the above combination.

|  | A | B | C | D |
|---|---|---|---|---|
| Formulation |  |  |  |  |
| Epoxy resin (EEW 190) | 100 | 100 | 100 | 100 |
| JEFFAMINE ®D-400[1] | 50 | 55 | — | — |
| JEFFAMINE ®D-400 Bis(propylamine)[2] | — | — | 42 | 50 |
| Diureide of JEFFAMINE ®D-2000[3] | — | 20 | — | 20 |
| Accelerator 398[4] | 10 | 10 | 10 | 10 |
| Properties of casting or adhesive bond |  |  |  |  |
| Elongation at break, % | — | — | 4.5 | 62 |
| Peel strength, pli | 2.1 | — | 3.2 | 25.9 |
| Bond: aluminum to aluminum |  |  |  |  |
| Tensile shear strength, psi | 2500 | 2500 | 1400 | 2900 |
| Bond: aluminum to aluminum |  |  |  |  |

[1] 400 MW polyoxyalkylenepolyamine
[2] aminoalkylene derivative of 400 MW polyoxyalkylenepolyamine polyether diureide of about 2000 M.W. (JEFFAMINE ®BUD-2000) Cured 7 days at room temperature (~25° C.)
[3] JEFFAMINE ®D-2000 is a 2000 MW polyoxyalkylenepolyamine
[4] mixture of alkanol amine and piperazine

EXAMPLE 2

This example demonstrates the effect of adding increasing amounts of a diureide of about 2000 molecular weight with a polyoxyalkylenepolyamine of 400 molecular weight. No improvement in adhesion strength was shown.

|  | A | B | C | D |
|---|---|---|---|---|
| Formulation |  |  |  |  |
| Epoxy resin (EEW 190) | 100 | 100 | 100 | 100 |
| JEFFAMINE ® D-400 | 50 | 50 | 50 | 50 |
| JEFFAMINE ® BUD-2000[1] | — | 5 | 10 | 20 |
| Accelerator 398 | 10 | 10 | 10 | 10 |
| Tensile shear strength, psi. | 2500 | 2500 | 2100 | 2300 |
| Bond: aluminum-to-aluminum |  |  |  |  |
| Cure: 7 days, R.T. |  |  |  |  |

[1] Bis(ureide) of a polyoxyalkylenepolyamine of MW≈2000

EXAMPLE 3

This example demonstrates the effect of adding increasing amounts of the diureide to an aminoalkyl derivative of a polyoxyalkylenepolyamine of 400 molecular weight. Peel and tensile shear strengths were considerably increased.

| Formulation | A | B | C | D |
|---|---|---|---|---|
| Epoxy resin (EEW 190) | 100 | 100 | 100 | 100 |
| JEFFAMINE ® D-400 Bis(propylamine) | 42 | 50 | 50 | 50 |
| JEFFAMINE ® BUD-2000 | — | 5 | 10 | 20 |
| Accelerator 398 | 10 | 10 | 10 | 10 |
| Tensile shear strength, psi Bond: Al-to-Al | 1400 | 3200 | 3300 | 2900 |
| Peel strength, pli. |  |  |  |  |

-continued

| Formulation | A | B | C | D |
|---|---|---|---|---|
| Bond: Al-to-Al Cure: 7 days, R.T. | 3.2 | 11.9 | 14.9 | 25.9 |

I claim:

1. An epoxy resin composition having superior adhesion properties and being the cured product of a curable admixture which comprises:
   a vicinal polyepoxide having an average of at least 1.8 reactive 1,2-epoxy groups per molecule;
   a polyether diureide having a molecular weight of about 2000 to 3000 and
   an aminopropyl derivative of a polyoxyalkylenepolyamine.

2. A composition as in claim 1 also containing a composition effective in accelerating the cure.

3. The composition of claim 1 wherein said diureide is of the formula

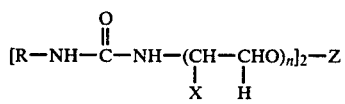

wherein R is hydrogen; or, a branched or straight chain alkyl radical of from 1 to about 10 carbon atoms, or a monocyclic aryl, alkaryl or aralkyl having from 6 to about 12 carbon atoms; or, are branched or straight chain alkenyl or alkadienyl radical of from 2 to about 10 carbon atoms; X is hydrogen, a methyl radical or an ethyl radical; Z is a hydrocarbon alkylene radical having 2 to 5 carbon atoms and n is a number selected such that the molecule of the above formula has a molecular weight of from about 2000 to about 3000.

4. The composition of claim 3 wherein R is hydrogen or a lower alkyl; X is a methyl radical; Z is a 1,2-propylene radical; and n is an average number from 16 to 19.

5. The composition of claim 3 wherein R is hydrogen.

6. The composition of claim 4 wherein R is a lower alkyl radical selected from the group consisting of methyl, ethyl, n-propyl and n-butyl.

7. An epoxy resin composition having superior adhesion properties and being the cured product of a curable admixture which comprises:
   a vicinal polyepoxide having an average of at least 1.8 reactive 1,2-epoxy groups per molecule;
   a polyether diureide having a molecular weight of about 2000 to 3000 and
   an aminopropyl derivative of a polyoxyalkylene polyamine having the following general structure:

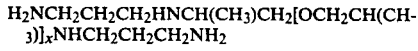

where x≅5.6.

8. A composition as in claim 7 also containing a composition effective in accelerating the cure.

9. The composition of claim 7 wherein said diureide is of the formula

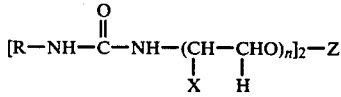

wherein R is hydrogen; or, a branched or straight chain alkyl radical of from 1 to about 10 carbon atoms, or a monocyclic aryl, alkaryl or aralkyl having from 6 to about 12 carbon atoms; or, are branched or straight chain alkenyl or alkadienyl radical of from 2 to about 10 carbon atoms; X is hydrogen, a methyl radical or an ethyl radical; Z is a hydrocarbon alkylene radical having 2 to 5 carbon atoms and n is a number selected such that the molecule of the above formula has a molecular weight of from about 2000 to about 3000.

10. The composition of claim 9 wherein R is hydrogen or a lower alkyl; X is a methyl radical; Z is a 1,2-propylene radical; and n is an average number from 16 to 19.

11. The composition of claim 9 wherein R is hydrogen.

12. The composition of claim 10 wherein R is a lower alkyl radical selected from the group consisting of methyl, ethyl, n-propyl and n-butyl.

13. A method for increasing the adhesive strength of a cured epoxy resin composition having an average of at least 1.8 reactive 1,2-epoxy groups per molecule comprising:
   adding to said epoxy resin effective amounts of a polyether diureide having a molecular weight of about 2000 to 3000 and in aminopropyl derivative of a polyoxyalkylenepolyamine and
   curing the above.

14. A method as in claim 13 wherein there is also added a composition effective in accelerating the cure.

15. A method as in claim 13 wherein said diureide is of the formula:

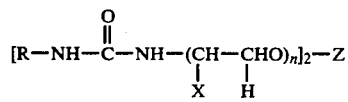

wherein R is hydrogen; or, a branched or straight chain alkyl radical of from 1 to about 10 carbon atoms, or a monocyclic aryl, alkaryl or aralkyl having from 6 to about 12 carbon atoms; or, are branched or straight chain alkenyl or alkedienyl radical of from 2 to about 10 carbon atoms; X is hydrogen, a methyl radical or an ethyl radical; Z is a hydrocarbon alkylene radical having 2 to 5 carbon atoms and n is a number selected such that the molecule of the above formula has a molecular weight of from about 2000 to about 3000.

16. A method as in claim 15 wherein R is hydrogen or a lower alkyl; X is a methyl radical; Z is a 1,2-propylene radical; and n is an average number from 16 to 19.

17. A method as in claim 15 wherein R is hydrogen.

18. A method as in claim 16 wherein R is a lower alkyl radical selected from the group consisting of methyl, ethyl, n-propyl and n-butyl.

19. A method for increasing the adhesive strength of a cured epoxy resin composition having an average of at least 1.8 reactive 1,2-epoxy groups per molecule comprising the step of:
   adding to said epoxy resin effective amounts of a polyether diureide having a molecular weight of about 2000 to 3000 and an aminopropyl polyamine having the following general structure:

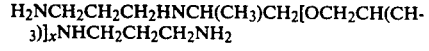

where x≅5.6 and curing the above.

20. A method as in claim 18 wherein there is also added a composition effective in accelerating the cure.

21. A method as in claim 18 wherein said diureide is of the formula:

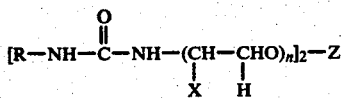

wherein R is hydrogen; or, a branched or straight chain alkyl radical of from 1 to about 10 carbon atoms, or a monocyclic aryl, alkaryl or aralkyl having from 6 to about 12 carbon atoms; or, are branched or straight chain alkenyl or alkadienyl radical of from 2 to about 10 carbon atoms; X is hydrogen, a methyl radical or an ethyl radical; Z is a hydrocarbon alkylene radical having 2 to 5 carbon atoms and n is a number selected such that the molecule of the above formula has a molecular weight of from about 2000 to about 3000.

22. A method as in claim 21 wherein R is hydrogen or a lower alkyl; X is a methyl radical; Z is a 1,2-propylene radical; and n is an average number from 16 to 19.

23. A method as in claim 21 wherein R is hydrogen.

24. A method as in claim 22 wherein R is a lower alkyl radical selected from the group consisting of methyl, ethyl, n-propyl and n-butyl.

* * * * *